(12) United States Patent
Otaibi et al.

(10) Patent No.: US 10,914,158 B2
(45) Date of Patent: Feb. 9, 2021

(54) METHODS AND SYSTEMS FOR HYDROCARBON RESOURCES EXPLORATION ASSESSMENT

(71) Applicant: Saudi Arabian Oil Company, Dhahran (SA)

(72) Inventors: Hussain M. Otaibi, Dhahran (SA); Fahad N. Najrani, Dhahran (SA); Marcin Folwarczny, Dhahran (SA)

(73) Assignee: Saudi Arabian Oil Company, Dhahran (SA)

( * ) Notice: Subject to any disclaimer, the term of this patent is extended or adjusted under 35 U.S.C. 154(b) by 228 days.

(21) Appl. No.: 16/125,020

(22) Filed: Sep. 7, 2018

(65) Prior Publication Data

US 2020/0080414 A1    Mar. 12, 2020

(51) Int. Cl.
| | | |
|---|---|---|
| *G01V 99/00* | (2009.01) | |
| *G06Q 30/02* | (2012.01) | |
| *E21B 47/003* | (2012.01) | |
| *G06F 16/29* | (2019.01) | |

(52) U.S. Cl.
CPC .......... *E21B 47/003* (2020.05); *G01V 99/005* (2013.01); *G06F 16/29* (2019.01); *G06Q 30/0283* (2013.01)

(58) Field of Classification Search
None
See application file for complete search history.

(56) References Cited

U.S. PATENT DOCUMENTS

| | | |
|---|---|---|
| 7,963,327 B1 | 6/2011 | Saleri et al. |
| 8,457,940 B2 | 6/2013 | Xi et al. |
| 8,749,549 B2 * | 6/2014 | Hantschel ............... G01V 99/00 345/418 |
| 8,793,111 B2 | 7/2014 | Tilke et al. |
| 9,767,421 B2 | 9/2017 | Saleri et al. |

(Continued)

FOREIGN PATENT DOCUMENTS

GB    2491715 A    12/2012

OTHER PUBLICATIONS

Bryant et al., "Evaluation of Unconventional Resources Using a Petroleum System Modeling Approach" SPE 168668 / URTeC 1526628, 2013 (Year: 2013).*

(Continued)

*Primary Examiner* — John C Kuan
(74) *Attorney, Agent, or Firm* — Bracewell LLP; Constance G. Rhebergen; Brian H. Tompkins

(57) ABSTRACT

Methods and systems for hydrocarbon resources exploration assessment are provided. Geospatial maps having corresponding hydrocarbon resources data may be obtained and classified. The geospatial maps may include composite common risk segment (CCRS) geospatial maps, reservoir and fluid properties geospatial maps, economics and costing geospatial maps, and prospect and leads geospatial maps. The geospatial maps may be integrated to generate an integrated map having each of geospatial maps as layers. An area of interest (AOI) may be defined on the integrated map and yet-to-find values, reserve volumes, pore volumes, and fluid properties, estimated prospect volumes, play chance and prospect success ratio, and average finding cost and average well cost may be determined for the area of interest (AOI).

15 Claims, 6 Drawing Sheets

(56) References Cited

U.S. PATENT DOCUMENTS

| | | | |
|---|---|---|---|
| 9,946,986 | B1 | 4/2018 | Saleri et al. |
| 10,138,717 | B1* | 11/2018 | Ludwig .................. E21B 43/00 |
| 2011/0142347 | A1 | 6/2011 | Chen et al. |
| 2011/0264430 | A1* | 10/2011 | Tapscott ................ G01V 99/00 703/10 |
| 2013/0110474 | A1 | 5/2013 | Saleri et al. |
| 2013/0110524 | A1 | 5/2013 | Saleri et al. |
| 2013/0262069 | A1 | 10/2013 | Leonard |
| 2013/0317798 | A1 | 11/2013 | Cheng et al. |
| 2014/0157172 | A1 | 6/2014 | Peery et al. |
| 2017/0337302 | A1 | 11/2017 | Mezghani et al. |
| 2017/0371984 | A1 | 12/2017 | Eliseeva et al. |
| 2018/0052253 | A1 | 2/2018 | Kuhn et al. |
| 2019/0392086 | A1* | 12/2019 | Anderson ............... G06F 17/40 |

OTHER PUBLICATIONS

Grant et al., "Play fairway analysis and risk mapping: an example using the Middle Jurassic Brent Group in the northern North Sea" NPF Special Publication 6, pp. 167-181, 1996 (Year: 1996).*
Neber et al., "Systematic Evaluation of Play and Prospect Risk Using a New Play-Based Exploration Methodology" Petroleum Geoscience Conference & Exhibition 2012 (Year: 2012).*
Fryberge et al., "Stratigraphy, Exploration and EOR potential of the Tensleep/Casper Formations, SE Wyoming" Search and Discovery Article #10851 (2016) (Year: 2016).*
International Search Report and Written Opinion for International Application No. PCT/US2019/049339 dated Nov. 4, 2019; pp. 1-13.

* cited by examiner

METHODS AND SYSTEMS FOR HYDROCARBON RESOURCES EXPLORATION ASSESSMENT

BACKGROUND

Field of the Disclosure

The present disclosure generally relates to hydrocarbon exploration. More specifically, embodiments of the disclosure relate to assessing hydrocarbon resources in areas of exploration interest.

Description of the Related Art

The proactive exploration and securement of future hydrocarbon resources (for example, oil and gas) is of strategic importance to petroleum and gas companies as well as sovereign states. However, the exploration and discovery of new hydrocarbon producing locations may be challenging due to different geological environments and conditions. Additionally, the exploration and subsequent production of hydrocarbons may involve very large financial and time commitments. The geological environments and conditions, financial commitments, time commitments, and other factors involved increase the difficulty in evaluating and classifying hydrocarbon resources in potential prospective areas. Moreover, the development and accuracy of long-term corporate strategies may depend heavily on the evaluation and classification of hydrocarbon resources in such areas.

SUMMARY

Embodiments of the disclosure generally relate to methods and systems for hydrocarbon resources exploration assessments using geospatial maps having corresponding hydrocarbon resources data.

In one embodiment, a computer-implemented method for hydrocarbon exploration assessment is provided. The method includes obtaining a first geospatial map that includes geospatial data associated with composite common risk segments, obtaining a second geospatial map that includes geospatial data associated with reservoir properties and fluid properties. The method also includes obtaining a third geospatial map that includes geospatial data associated with averaging finding costs and cost per barrel of hydrocarbon and obtaining a fourth geospatial map that includes geospatial data associated expected volumes and petroleum risking details. The method also includes generating an integrated map corresponding to a geographic region and having a plurality of geospatial layers, the geographic region including a plurality of reservoirs. The plurality of geospatial layers include a first geospatial layer corresponding to the first geospatial map, a second geospatial layer corresponding to the second geospatial map, a third geospatial layer corresponding to the third geospatial map, and a fourth geospatial layer corresponding to the fourth geospatial map. The method further includes defining an area of interest on the integrated map, the area of interest including an area within the geographic region, and determining, using the plurality of geospatial layers, a plurality of hydrocarbon exploration attributes for the area of interest. Determining a plurality of hydrocarbon exploration attributes for the area of interest includes determining a yet-to-find value for the area of interest, determining a reserve volume or a pore volume for the area of interest, determining an average finding cost or an average well cost for the area of interest, and determining a play chance or an estimated prospect volume for the area of interest.

In some embodiments, the method includes comparing a first one of the plurality of reservoirs to a second one of the plurality of reservoirs based on at least one of the plurality of attributes. In some embodiments, the method includes selecting the first one of the plurality of reservoirs for drilling based on the comparison. In some embodiments, the method includes drilling a well in the first one of the plurality of reservoirs. In some embodiments, the method includes generating a visualization of a comparison a first one of the plurality of reservoirs to a second one of the plurality of reservoirs based on at least one of the plurality of attributes. In some embodiments, the visualization includes a quadrant plot of a first one of the plurality of attributes versus a second one of the plurality of attributes such that the quadrant plot includes a point for each of the plurality of reservoirs. In some embodiments, determining a plurality of hydrocarbon resource attributes for the area of interest includes performing the following for each of the plurality of attributes: determining a plurality of fractions of the defined area of interest within a respective plurality of sections of a geospatial layer of the integrated map; determining a value of an attribute in each of the plurality of sections; determining a plurality of fractional attributes by multiplying the attribute value for each of the plurality of sections by the respective fraction of the plurality of fractions; and determining a value for the attribute for the defined area of interest by summing the plurality of fractional attribute values.

In another embodiment, a system for hydrocarbon resource exploration assessment includes a processor and a non-transitory computer-readable storage memory accessible by the processor and having executable code stored thereon, the executable code including a set of instructions that causes the processor to perform operations that include obtaining a first geospatial map that includes geospatial data associated with composite common risk segments, obtaining a second geospatial map that includes geospatial data associated with reservoir properties and fluid properties. The operations also include obtaining a third geospatial map that includes geospatial data associated with averaging finding costs and cost per barrel of hydrocarbon and obtaining a fourth geospatial map that includes geospatial data associated expected volumes and petroleum risking details. The operations also include generating an integrated map corresponding to a geographic region and having a plurality of geospatial layers, the geographic region including a plurality of reservoirs. The plurality of geospatial layers include a first geospatial layer corresponding to the first geospatial map, a second geospatial layer corresponding to the second geospatial map, a third geospatial layer corresponding to the third geospatial map, and a fourth geospatial layer corresponding to the fourth geospatial map. The operations further include defining an area of interest on the integrated map, the area of interest including an area within the geographic region, and determining, using the plurality of geospatial layers, a plurality of hydrocarbon exploration attributes for the area of interest. Determining a plurality of hydrocarbon exploration attributes for the area of interest includes determining a yet-to-find value for the area of interest, determining a reserve volume or a pore volume for the area of interest, determining an average finding cost or an average well cost for the area of interest, and determining a play chance or an estimated prospect volume for the area of interest.

In some embodiments, the operations include comparing a first one of the plurality of reservoirs to a second one of the plurality of reservoirs based on at least one of the plurality of attributes. In some embodiments, the method includes selecting the first one of the plurality of reservoirs for drilling based on the comparison. In some embodiments, the operations include generating a visualization of a comparison a first one of the plurality of reservoirs to a second one of the plurality of reservoirs based on at least one of the plurality of attributes. In some embodiments, the visualization includes a quadrant plot of a first one of the plurality of attributes versus a second one of the plurality of attributes such that the quadrant plot includes a point for each of the plurality of reservoirs. In some embodiments, the system includes a display, such that the operations comprise providing the visualization on the display. In some embodiments, determining a plurality of hydrocarbon resource attributes for the area of interest includes performing the following for each of the plurality of attributes: determining a plurality of fractions of the defined area of interest within a respective plurality of sections of a geospatial layer of the integrated map; determining a value of an attribute in each of the plurality of sections; determining a plurality of fractional attributes by multiplying the attribute value for each of the plurality of sections by the respective fraction of the plurality of fractions; and determining a value for the attribute for the defined area of interest by summing the plurality of fractional attribute values.

In another embodiment, a non-transitory computer-readable storage medium having executable code stored thereon for hydrocarbon resource exploration assessment is provided. The executable code includes a set of instructions that causes a processor to perform operations that include obtaining a first geospatial map that includes geospatial data associated with composite common risk segments, obtaining a second geospatial map that includes geospatial data associated with reservoir properties and fluid properties. The operations also include obtaining a third geospatial map that includes geospatial data associated with averaging finding costs and cost per barrel of hydrocarbon and obtaining a fourth geospatial map that includes geospatial data associated expected volumes and petroleum risking details. The operations also include generating an integrated map corresponding to a geographic region and having a plurality of geospatial layers, the geographic region including a plurality of reservoirs. The plurality of geospatial layers include a first geospatial layer corresponding to the first geospatial map, a second geospatial layer corresponding to the second geospatial map, a third geospatial layer corresponding to the third geospatial map, and a fourth geospatial layer corresponding to the fourth geospatial map. The operations further include defining an area of interest on the integrated map, the area of interest including an area within the geographic region, and determining, using the plurality of geospatial layers, a plurality of hydrocarbon exploration attributes for the area of interest. Determining a plurality of hydrocarbon exploration attributes for the area of interest includes determining a yet-to-find value for the area of interest, determining a reserve volume or a pore volume for the area of interest, determining an average finding cost or an average well cost for the area of interest, and determining a play chance or an estimated prospect volume for the area of interest. In some embodiments, the operations include comparing a first one of the plurality of reservoirs to a second one of the plurality of reservoirs based on at least one of the plurality of attributes. In some embodiments, the method includes selecting the first one of the plurality of reservoirs for drilling based on the comparison. In some embodiments, the operations include generating a visualization of a comparison a first one of the plurality of reservoirs to a second one of the plurality of reservoirs based on at least one of the plurality of attributes. In some embodiments, the visualization includes a quadrant plot of a first one of the plurality of attributes versus a second one of the plurality of attributes such that the quadrant plot includes a point for each of the plurality of reservoirs. In some embodiments, determining a plurality of hydrocarbon resource attributes for the area of interest includes performing the following for each of the plurality of attributes: determining a plurality of fractions of the defined area of interest within a respective plurality of sections of a geospatial layer of the integrated map; determining a value of an attribute in each of the plurality of sections; determining a plurality of fractional attributes by multiplying the attribute value for each of the plurality of sections by the respective fraction of the plurality of fractions; and determining a value for the attribute for the defined area of interest by summing the plurality of fractional attribute values.

DETAILED DESCRIPTION

The present disclosure will be described more fully with reference to the accompanying drawings, which illustrate embodiments of the disclosure. This disclosure may, however, be embodied in many different forms and should not be construed as limited to the illustrated embodiments. Rather, these embodiments are provided so that this disclosure will be thorough and complete, and will fully convey the scope of the disclosure to those skilled in the art.

Methods and systems are provided for hydrocarbon resources exploration assessments using geospatial maps. Geospatial maps having corresponding hydrocarbon resources data may be obtained. The geospatial maps may include composite common risk segment (CCRS) geospatial maps, reservoir and fluid properties geospatial maps, economics and costing geospatial maps, and prospect and leads geospatial maps. The geospatial maps are integrated to generate an integrated map having each of the geospatial maps as a layer. An area of interest (AOI) may be defined on the integrated map and different attributes for the defined area of interest (AOI) are determined. For example, yet-to-find values, reserve volumes, pore volumes, and fluid properties, estimated prospect volumes, play chance and prospect success ratio, and average finding cost and average well cost may be determined for the define area of interest (AOI).

Using the embodiments described in the disclosure, hydrocarbon resources may be integrated and classified, and various actions performed based on the assessment. For example, in some embodiments, exploration targets in an area of interest may be set based on the compiled hydrocarbon resources volumes, risks, and economics. In some embodiments, additional targets may be added to specific exploration well based on the estimated resources of non-targeted hydrocarbon reservoirs. In some embodiments, the risks associated with a region or surrounding areas may be compared with the risk of a newly proposed exploration well. Additionally, in some embodiments, the assessment may be used to populate a petroleum resource management system (PRMS).

Figure 1:
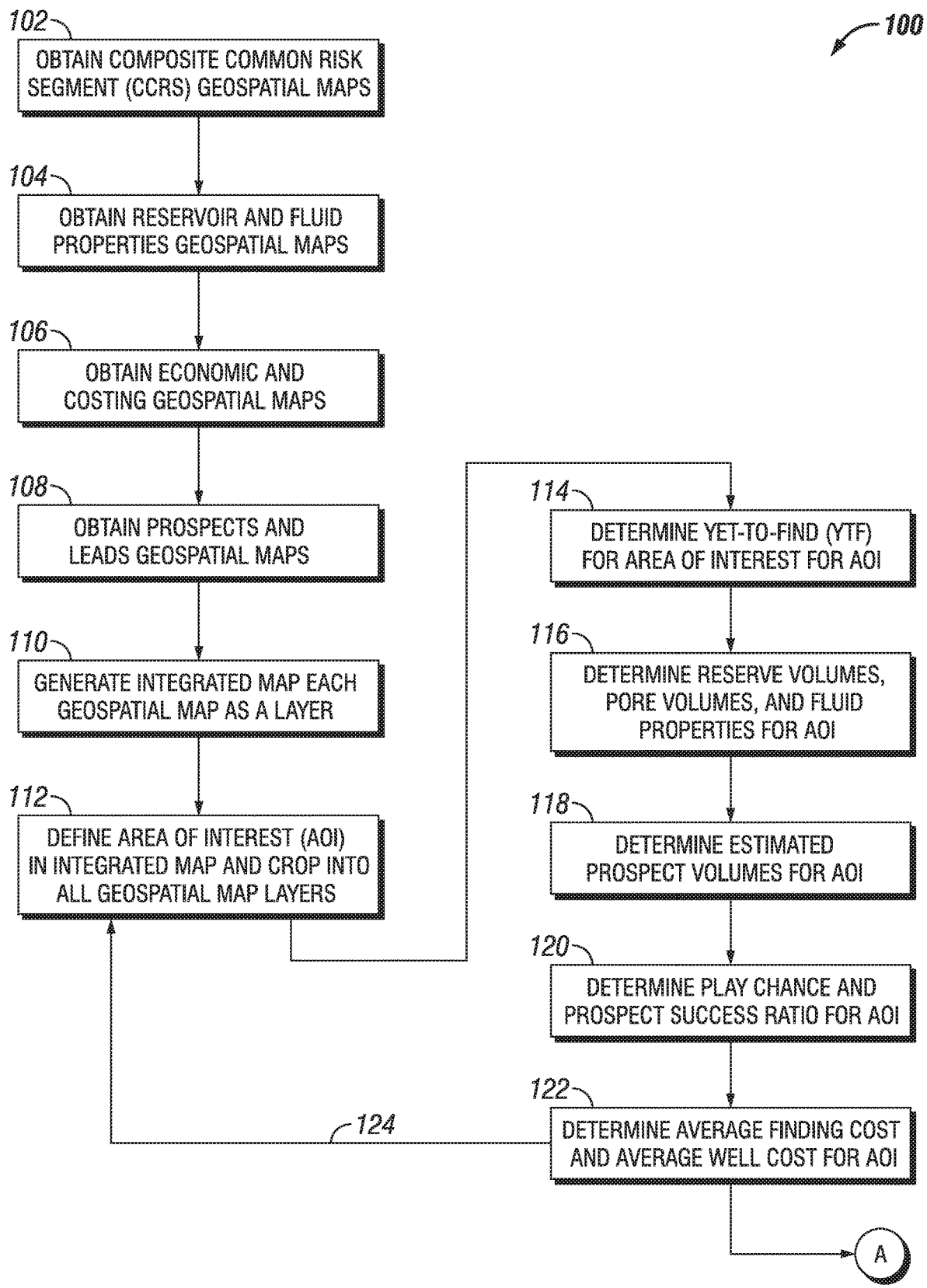
FIGS. 1 and 2 are block diagrams of a process for a hydrocarbon resources exploration assessment in accordance with an embodiment of the disclosure.

FIG. 1 depicts a process 100 for a hydrocarbon resources exploration assessment in accordance with an embodiment of the disclosure. Initially, composite common risk segment (CCRS) geospatial maps may be obtained (block 102). In some embodiments, for example, the CCRS geospatial maps may be accessed from a database. A CCRS geospatial map may be associated with a hydrocarbon play and may include multiple sections (for example, polygons). Each section may represent a shared geology and may be associated with petroleum system elements risking and the estimated hydrocarbon volumes expressed as yet-to-find (YTF). In some embodiments, a CCRS geospatial map may include previously drilled wells to represent the cause (or causes) of failure.

Next, reservoir and fluid properties geospatial maps may be obtained (block 104). The reservoir and fluid properties geospatial maps may include reservoir properties and fluids properties. In some embodiments, the reservoir and fluids properties may include, for example, porosity, permeability, pore volumes, viscosity, formation volume factor, gas-oil ratio, condensate-gas ratio and reserves volumes. In some embodiments, geospatial maps that include contingent resources may also be obtained and may include similar properties. A reservoir and fluids properties geospatial map may include multiple sections (for example, polygons). Each section may represent a reservoir outline.

Economics and costing geospatial maps may also be obtained (block 106). The economics and costing geospatial maps may include, for example, averaging finding costs and cost per barrel of hydrocarbon. An economics and costing geospatial maps may be associated may include multiple sections (for example, polygons), and each section may include average finding cost and average well cost.

Additionally, prospect and leads (that is, future hydrocarbon planned drilling opportunities) geospatial maps may be obtained (block 108). The prospect and leads geospatial maps include expected volumes and petroleum risking details associated with every prospect or lead. In some embodiments, the prospect and lead geospatial maps may be filtered for targeted reservoirs. The prospect and leads geospatial maps may also include drilling activities. In some embodiments, the prospect and leads geospatial maps may include existing country boundaries and field outlines. A prospect and leads geospatial maps may include multiple sections (for example, polygons), and each section may represent prospective opportunities to be drilled and include risk evaluation, estimated volumes, and target reservoirs.

The obtained geospatial maps may be integrated to generate an integrated map having each of the input geospatial maps as layers (block 110). In some embodiments, the integrated map may show various geographical features that may be obtained from geospatial maps or from a geographic information system (GIS). The integrated map may, in some embodiments, show the locations of reservoirs, as identified from one or more of the geospatial maps.

Next, an area of interest (AOI) may be defined on the integrated map (block 112). For example, in some embodiments, a visual representation of the geographical area corresponding to the integrated map may be provided in graphical user interface (GUI) for selection by a user. In other embodiments, numerical coordinates or other numbers may be used to define an area of interest. In other embodiments, an area of interest (AOI) may be defined to encompass a specific number (for example, one, two, three, four, or more) of reservoirs.

Various determinations may be performed based on the area of interest (AOI). For example, a yet-to-find (YTF) value for the area of interest (AOI) may be determined (block 114). In another example, reserve volumes, pore volumes, and fluid properties for the area of interest (AOI) may be determined (block 116). Additionally, estimated prospect volumes for the area of interest (AOI) may be determined (block 118). The play chance and prospect success ratio for the area of interest (AOI) may be determined (block 120). Further, the average finding cost and average well cost for the area of interest (AOI) may be determined (block 122).

As shown by line 124, a new or modified area of interest (AOI) may be defined. For example, a user may redraw an area of interest (AOI) on the visual representation of the geographical area corresponding to the integrated map. After a new or modified area of interest is defined (block 112), the various determinations of the process 100 may be performed for the new or modified area of interest (AOI).

Figure 2:
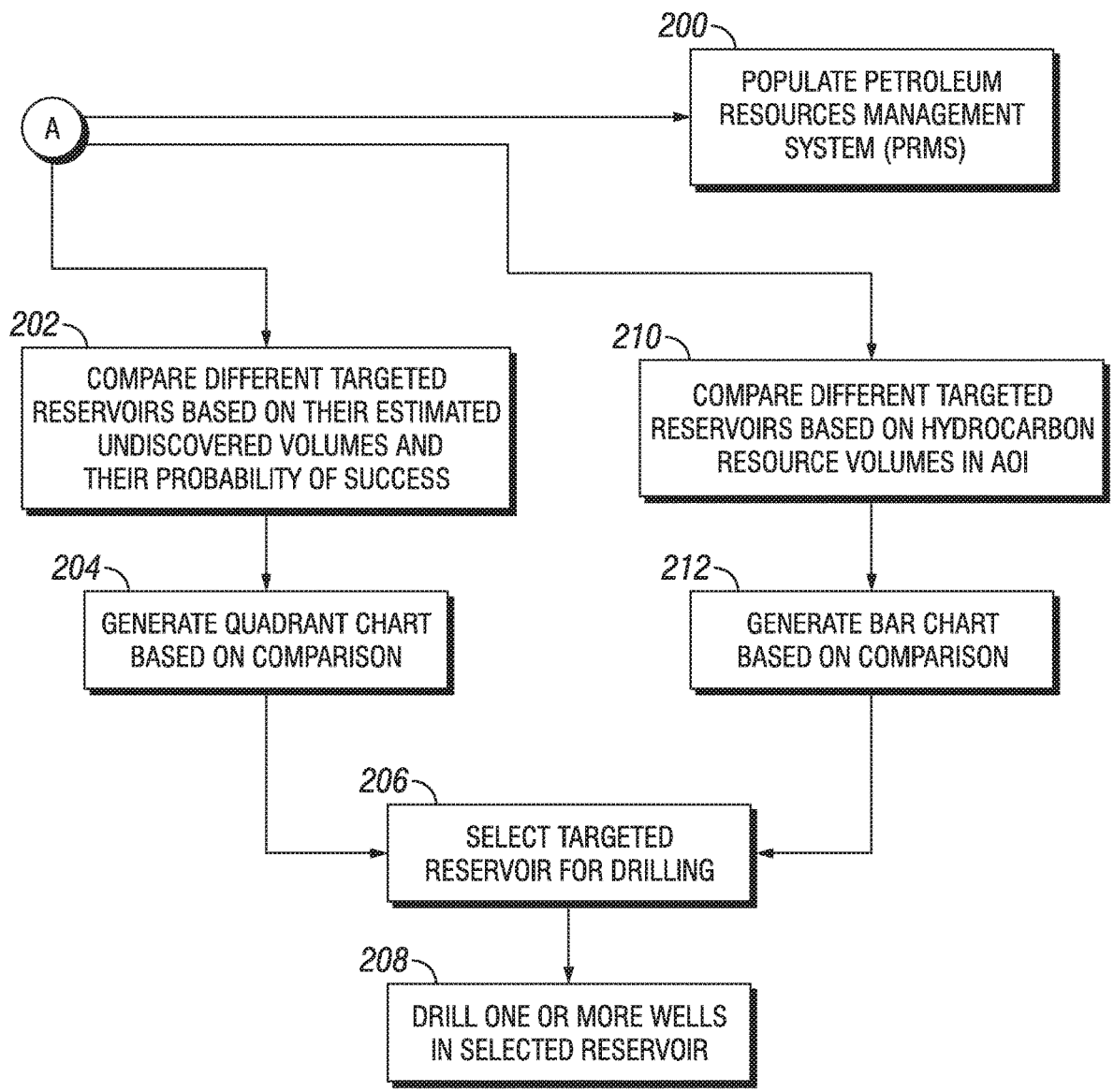

Different actions may be performed based on the various determinations illustrated in FIG. 1, or the various determinations may be used by other systems. As shown by connection block A in FIGS. 1 and 2, the process 100 is further illustrated in FIG. 2 to show these additional actions and uses. In some embodiments, a petroleum resources management system (PRMS) may be populated using the determinations (block 200). In some embodiments, different targeted reservoirs may be compared based on their estimated undiscovered volumes and the associated probabilities of success (block 202). In such embodiments, a visualization of the comparison may be generated. For example, a quadrant chart may be generated from the comparison of different targeted reservoirs based on their estimated undiscovered volumes and the associated probabilities of success (block 204). Using the comparison, a targeted reservoir may be selected for drilling (block 206), and one or more wells may be drilled in the selected reservoir (block 208).

In some embodiments, different targeted reservoirs may be compared based on hydrocarbon resource volumes in the area of interest (AOI) (block 210). In such embodiments, a visualization of the comparison may be generated. For example, a bar chart may be generated from the comparison of different targeted reservoirs based on their estimated undiscovered volumes and the associated probabilities of success (block 212). Using the comparison, a targeted reservoir may be selected for drilling (block 206), and one or more wells may be drilled in the selected reservoir (block 208). As will be appreciated, multiple comparisons and corresponding visualizations may be performed.

Further, in some embodiments, exploration targets in the defined area of interest (AOI) may be determined based on the compiled hydrocarbon resources volumes, risks, and economics. In some embodiments, additional targets may be added to specific exploration well based on the estimated resources of non-targeted hydrocarbon reservoirs. In some embodiments, the risks associated with a region or surrounding areas may be compared with the risk of a newly proposed exploration well, such as by using multiple areas of interest to determine different risks.

FIGS. 3-6 depict example area of interests (AOIs) defined on different geospatial layers of an integrated map in accordance with embodiments of the disclosure. Each geospatial layer may include different sections, portions of which may be captured in a defined area of interest (AOI) as discussed below.

Figure 3:
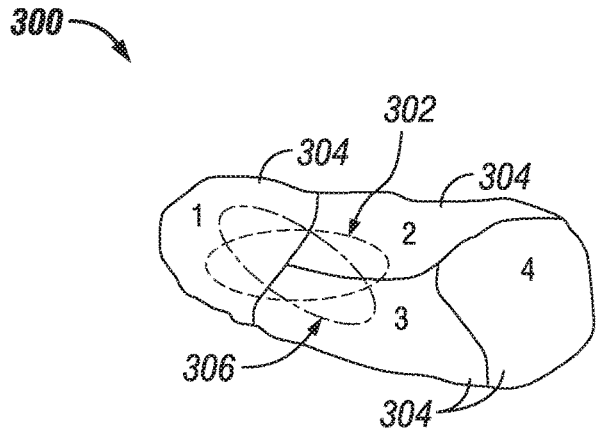
FIG. 3 is a schematic diagram of an example geospatial layer of an integrated map and an area of interest (AOI) in accordance with an embodiment of the disclosure.

FIG. 3 depicts an example geospatial layer 300 of an integrated map and an area of interest (AOI) 302 in accordance with an embodiment of the disclosure. The example geospatial layer 300 shown in FIG. 3 corresponds to a composite common risk segment (CCRS) geospatial map as described in the disclosure. As shown in FIG. 3, the geospatial layer 300 includes three defined sections 304 (labeled as 1, 2, 3, and 4 in FIG. 3); however, it should be appreciate that the illustrated geospatial layer 300 is only an example and other geospatial layers used with embodiments of the disclosure may have more sections of different shapes and sizes.

As further shown in FIG. 3, the area of interest (AOI) 302 overlaps three of the sections 304 (sections 1, 2, and 3). Embodiments of the disclosure may determine a yet-to-find value for the area of interest (AOI) 302 in accordance with the techniques described herein. Table 1 depicts the determination of the yet-to-find value for the area of interest (AOI) 302 using the yet-to-find values for each section 304 according to their coverage within the area of interest (AOI) 302.

TABLE 1

YET-TO-FIND (YTF) DETERMINATION FOR FIG. 3

| Section Number | YTF in section | % of section within AOI | YTF from section in the AOI |
|---|---|---|---|
| 1 | 100 | 35% | 35 |
| 2 | 50 | 22% | 11 |
| 3 | 80 | 20% | 16 |
| 4 | 20 | 0% | 0 |

Using Table 1, the total yet-to-find (YTF) value for the area of interest (AOI) 302 is (35+11+16)=62.

Additionally, in FIG. 3, a second area of interest (AOI) 306 overlaps three of the sections 304 (sections 1, 2, and 3). Embodiments of the disclosure may determine play chance and prospect success ratio values for the area of interest (AOI) 306 in accordance with the techniques described herein. Table 2 depicts the determination of play chance and prospect success ratio values for the second area of interest (AOI) 306 using the weighted play chance and prospect success ratio for each section 304 according to their coverage within the area of interest (AOI) 306.

TABLE 2

PLAY CHANCE AND PROSPECT SUCCESS RATIO DETERMINATION FOR FIG. 3

| Section Number | % section within AOI | Play Chance | Prospect Success Ratio | Play Chance in AOI Fraction | Prospect Success Ratio in AOI Fraction |
|---|---|---|---|---|---|
| 1 | 40% | 1.0 | 0.25 | 40% | 10% |
| 2 | 35% | 0.8 | 0.17 | 28% | 6% |
| 3 | 25% | 0.4 | 0.05 | 10% | 1% |

Using Table 2, the play chance value for the area of interest (AOI) 306 is (40+28+10)=78%. The prospect success ratio for the area of interest (AOI) 306 is (10+6+1)=17%.

Figure 4:
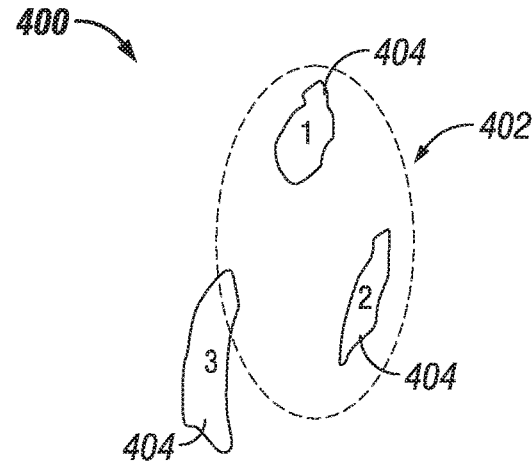
FIG. 4 is a schematic diagram of an example geospatial layer of an integrated map and an area of interest (AOI) in accordance with an embodiment of the disclosure.

FIG. 4 depicts an example geospatial layer 400 of an integrated map and an area of interest (AOI) 402 in accordance with an embodiment of the disclosure. The example geospatial layer 400 shown in FIG. 4 corresponds to a reservoir and fluid properties geospatial map as described in the disclosure. As shown in FIG. 4, the geospatial layer 400 includes three defined sections 404 (labeled as 1, 2, and 3 in FIG. 4); however, it should be appreciate that the illustrated geospatial layer 400 is only an example and other geospatial layers used with embodiments of the disclosure may have more sections of different shapes and sizes. Moreover, as shown by the example illustrated in FIG. 4, the sections in a geospatial map need not be contiguous.

As further shown in FIG. 4, the area of interest (AOI) 402 overlaps some or all of the three sections 404. For example, as shown in FIG. 4, the area of interest (AOI) 402 overlaps the entirety of section 1 and the entirety of section 2. Embodiments of the disclosure may determine a reserve volumes, pore volumes, and reservoir and fluid properties for the area of interest (AOI) 402 in accordance with the techniques described herein. Table 3 depicts the determination of the yet-to-find value for the area of interest (AOI) 402 using the yet-to-find values for each section 404 according to their coverage within the area of interest (AOI) 402. As will be appreciated, the reservoir and fluids properties value is provided as composite value. However, the techniques described in the disclosure may be applied to any single reservoir and fluid property (for example, porosity, permeability, density, etc.)

TABLE 3

RESERVE VOLUMES, PORE VOLUMES, AND RESERVOIR AND FLUID PROPERTIES DETERMINATIONS FOR FIG. 4

| Section Number | % of section within AOI | Reserve Volumes | Pore Volumes | Reservoir and fluids properties (all parameters) |
|---|---|---|---|---|
| 1 | 100% | 100 | 70 | 35 |
| 2 | 100% | 50 | 30 | 12 |
| 3 | 10% | 80 | 20 | 16 |

Using the data shown in Table 3, the reserve volume for the area of interest (AOI) 402 is (100*100%+50*100%+80*10%)=158, and the pore volume for the area of interest (AOI) 402 is (70*100%+30*100%+20*10%)=102. In some embodiments, the reservoir and fluids properties may be determined as a non-weighted average. In such embodiments, the average reservoir and fluid properties for the area of interest (AOI) 402 is (35+12+16)/3=21.

Figure 5:
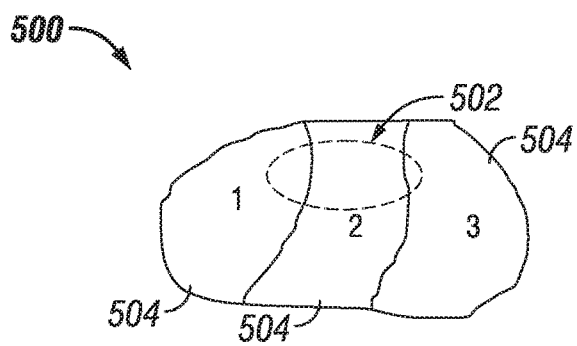
FIG. 5 is a schematic diagram of an example geospatial layer of an integrated map and an area of interest (AOI) in accordance with an embodiment of the disclosure.

FIG. 5 depicts an example geospatial layer 500 of an integrated map and an area of interest (AOI) 502 in accordance with an embodiment of the disclosure. The example geospatial layer 500 shown in FIG. 5 corresponds to an economics and costing geospatial map as described in the disclosure. As shown in FIG. 5, the geospatial layer 500 includes three defined sections 504 (labeled as 1, 2, and 3 in FIG. 5); however, it should be appreciate that the illustrated geospatial layer 500 is only an example and other geospatial layers used with embodiments of the disclosure may have more sections of different shapes and sizes. As noted above, the sections in a geospatial map need not be contiguous.

As shown in FIG. 5, the area of interest (AOI) 502 overlaps some or all of the three sections 404. For example, as shown in FIG. 5, the area of interest (AOI) 502 overlaps the 15% of section 1, 70% of section 2, and 5% of section 3. Embodiments of the disclosure may determine an average finding cost and an average well cost for the area of interest (AOI) 502 in accordance with the techniques described herein. Table 4 depicts the determination of the average finding cost and average well cost for the area of interest (AOI) 502 using the average finding cost and average well cost for each section 504 according to their coverage within the area of interest (AOI) 502.

TABLE 4

AVERAGE FINDING COST AND AVERAGE WELL
COST DETERMINATIONS FOR FIG. 5

| Section Number | % of section within AOI | Average Finding Cost | Average Well Cost | Average Finding Cost (AOI Fraction) | Average Well Cost (AOI Fraction) |
|---|---|---|---|---|---|
| 1 | 25% | 18 | 12 | 4.5 | 3 |
| 2 | 70% | 22 | 17 | 15.4 | 11.9 |
| 3 | 5% | 15 | 10 | 0.75 | 0.5 |

Using Table 4, the average finding cost for the area of interest (AOI) 502 is (4.5+15.4+0.75)=20.65, and the average well cost for the area of interest (AOI) 502 is (3+11.9+0.5)=15.4.

Figure 6:
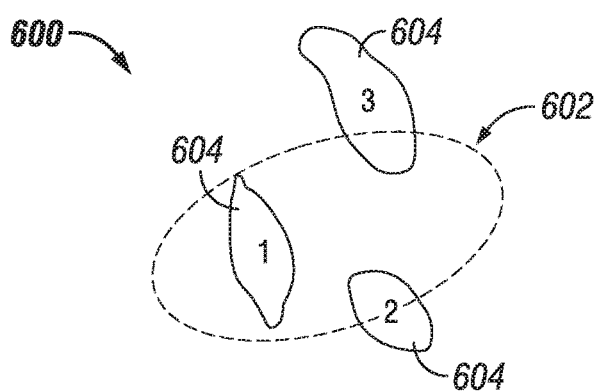
FIG. 6 is a schematic diagram of an integrated map and an area of interest (AOI) in accordance with an embodiment of the disclosure.

FIG. 6 depicts an example geospatial layer 600 of an integrated map and an area of interest (AOI) 602 in accordance with an embodiment of the disclosure. The example geospatial layer 600 shown in FIG. 6 corresponds to a prospects and leads geospatial map as described in the disclosure. As shown in FIG. 6, the geospatial layer 600 includes three defined sections 604 (labeled as 1, 2, and 3 in FIG. 6); however, it should be appreciate that the illustrated geospatial layer 600 is only an example and other geospatial layers used with embodiments of the disclosure may have more sections of different shapes and sizes. As noted above, the sections in a geospatial map need not be contiguous.

As shown in FIG. 6, the area of interest (AOI) 602 overlaps some or all of the three sections 604. For example, as shown in FIG. 6, the area of interest (AOI) 602 overlaps 100% of section 1, 50% of section 2, and 25% of section 3. Embodiments of the disclosure may determine a prospect estimated volume for the area of interest (AOI) 602 in accordance with the techniques described herein. Table 5 depicts the determination of and the prospect estimated volume for the area of interest (AOI) 602 using and the prospect estimated volume for each section 604 according to their coverage within the area of interest (AOI) 602.

TABLE 5

PROSPECT RISK AND PROSPECT ESTIMATED
VOLUME DETERMINATIONS FOR FIG. 6

| Section Number | % of section within AOI | Prospect Risk (play chance) | Prospect Estimated Volume | Prospect volume (AOI fraction) |
|---|---|---|---|---|
| 1 | 100% | 25 | 900 | 900 |
| 2 | 50% | 10 | 750 | 375 |
| 3 | 5% | 25 | 18 | 313 |

Using the data shown in Table 5, the prospect volume for the AOI fraction is (900+375+313)=1588.

Figure 7:
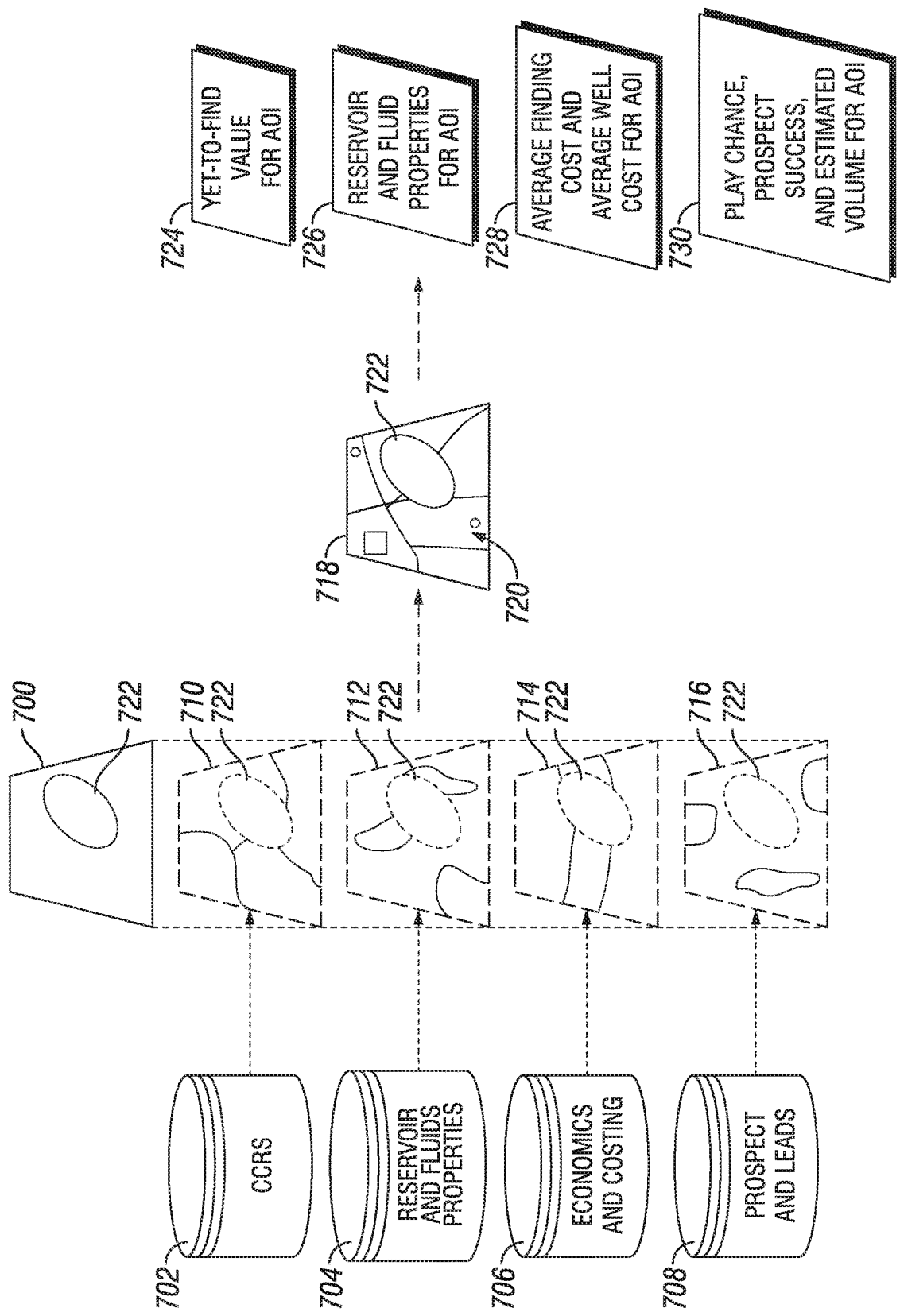
FIG. 7 is a schematic diagram depicting the generation of an integrated map from various geospatial maps in accordance with an embodiment of the disclosure.

FIG. 7 depicts the generation of an integrated map from various geospatial maps in accordance with an embodiment of the disclosure. FIG. 7 depicts various databases that provide geospatial maps for use in an integrated map 700. For example, FIG. 7 depicts a composite common risk segment (CCRS) geospatial maps database 702, a reservoir and fluid properties geospatial maps database 704, an economics and costing geospatial maps database 706, and a prospect and leads geospatial maps database 708.

Each database may provide geospatial maps having associated attributes. As described in the disclosure, geospatial maps from each databased may form geospatial layers in the integrated map 700. As shown in FIG. 7, a first geospatial layer 710 may be generated using the composite common risk segment (CCRS) geospatial maps database 702 and a second geospatial layer 712 may be generated using the reservoir and fluid properties geospatial maps database 704. As also shown in FIG. 7, a third geospatial layer 714 may be generated using the economic and geospatial maps database 706, and a fourth geospatial layer 716 may be generated from the prospect and leads database 710. Each geospatial layer 710, 712, 714 and 716 includes different attributes that may be associated with the geospatial data for a given geographic area. The exploded integrated map 700 in FIG. 7 illustrates how the different geospatial layers 710, 712, 714 and 716 are integrated to form an integrated map 700 having the geospatial data for a given geographic area and including the associated attributes in each geospatial layer.

FIG. 7 also shows an additional visual representation 718 of the integrated map that includes, for example, various geographical features 720. As discussed in the disclosure, an area of interest (AOI) 722 on the visual representation 718 of the integrated map. The area of interest (AOI) 722 may encompass a geographical area depicted in the visual representation 718. As discussed in the disclosure, the attributes for each geospatial layer 710, 712, 714 and 716 of the integrated map 700 may be determined based on the defined area of interest (AOI) 722. For example, as shown in the geospatial layers 710, 712, 714 and 716, the defined area of interest (AOI) 722 may be applied to each of the geospatial layers 710, 712, 714 and 716 for determinations of attributes for the defined area of interest (AOI) 722.

FIG. 7 also shows example determinations of attributes from each geospatial layer 710, 712, 714 and 716 based on the defined area of interest (AOI) 722. For example, in some embodiments, yet-to-find values may be determined for the area of interest (AOI) 722 (block 724). In some embodiments, reserve volumes, pore volumes, and fluid properties may be determined for the area of interest (AOI) 722 (block 726). In some embodiments, average finding cost and average well cost for the area of interest (AOI) 722 may be determined (block 728). In some embodiments, play chance, prospect success values, and estimated volumes may be determined for the area of interest (AOI) 722 (block 730).

Figure 8:
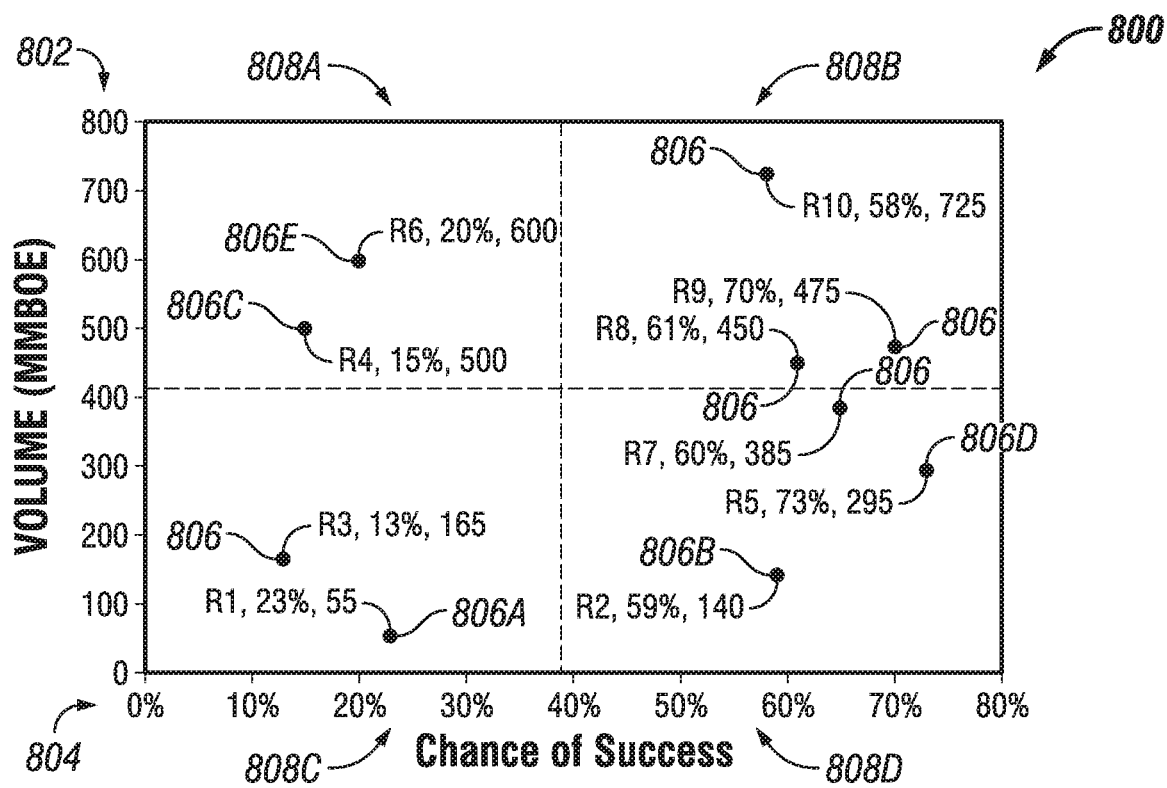
FIG. 8 is an example plot of undiscovered volumes vs. chance of success in accordance with an embodiment of the disclosure.

In some embodiments, visualizations of the geospatial layer attributes for a defined area of interest (AOI) may be determined. FIG. 8 depicts an example plot 800 of undiscovered volumes vs chance of success in accordance with an embodiment of the disclosure. FIG. 8 depicts the plot 800 having undiscovered volume on the y-axis 802 in Million Barrels of Oil Equivalents (MMBOE) and the chance of success on the x-axis 804 in percentages. The plot 800 include data points 806 corresponding to different reservoirs within a defined area of interest (AOI). For example, data points 806A corresponds to reservoir R1 having a 23% chance of success and a 165 MMBOE undiscovered volume. In another example, data point 806B corresponds to reservoir R2 having 59% chance of success and a 140 MMBOE undiscovered volume. As shown in FIG. 8, the other data points 806C, 806D, 806E, and so on correspond to reservoirs R4, R5, R6, and so on. The plot 800 may be divided into quadrants 808 to further enable easier classification and evaluation of potential exploration opportunities different reservoirs within a defined area of interest (AOI).

Using the example plot 800 depicted in FIG. 8, different reservoirs within a defined area of interest (AOI) may be compared. For example, reservoirs in the upper right quadrant 808B may be most desirable for further exploration and/or drilling based on the combination of chance of success and volume. In contrast, reservoirs in the lower left quadrant may be least desirable for further exploration and/or drilling based on the combination of success and volume. In some embodiments, a reservoir may be selected for drilling based on an evaluation of the plot 800. One or more wells may be drilling in the selected reservoir to further discover and evaluate hydrocarbon resources located in the reservoir.

Figure 9:
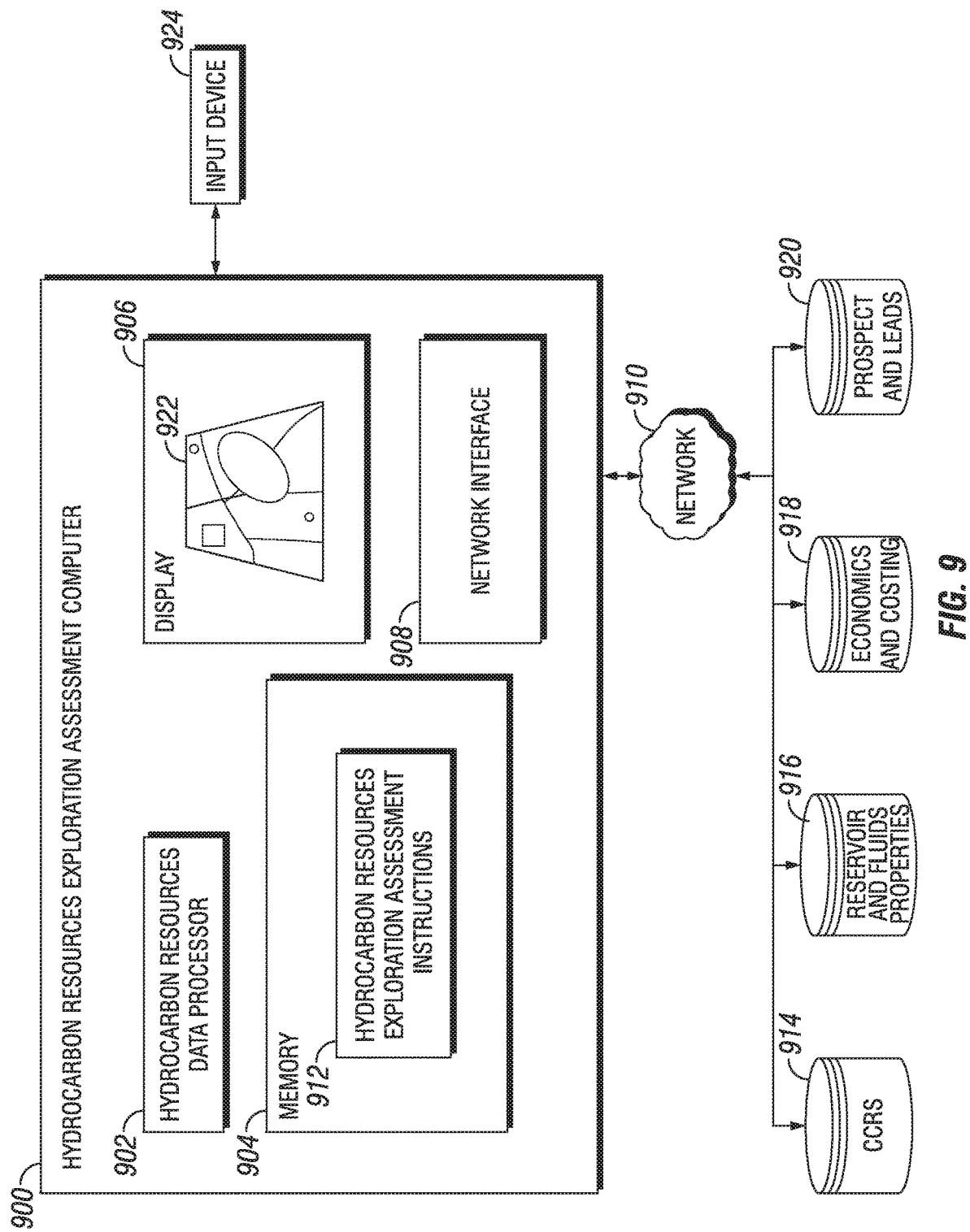
FIG. 9 is a block diagram of a hydrocarbon resources exploration assessment computer 900 in accordance with an embodiment of the disclosure.

FIG. 9 depicts components of a hydrocarbon resources exploration assessment computer 900 in accordance with an embodiment of the disclosure. In some embodiments, the hydrocarbon resources exploration assessment computer 900 may be in communication with other components of a system for obtaining hydrocarbon resources data. Such other components may include, for example, logging-while-drilling (LWD) systems, measurement-while-drilling (MWD) systems, and other systems that acquire information about hydrocarbon resources. As will be appreciated, such systems may use downhole tools, downhole sensors, drilling components, and other components for acquiring information about subsurface hydrocarbon resources.

As shown in FIG. 9, the hydrocarbon resources exploration assessment computer 900 may include a hydrocarbon resources data processor 902, a memory 904, a display 906, and a network interface 908 that may be in communication with a network 910. It should be appreciated that the hydrocarbon resources exploration assessment computer 900 may include other components that are omitted for clarity. In some embodiments, hydrocarbon resources exploration assessment computer 900 may include or be a part of a computer cluster, cloud-computing system, a data center, a server rack or other server enclosure, a server, a virtual server, a desktop computer, a laptop computer, a tablet computer, or the like. In some embodiments, the hydrocarbon resources exploration assessment computer 900 is not a part or does not have access to additional computing resources of a computer cluster, cloud computing system, etc., and may be used on-site at a remote wellsite for example.

The hydrocarbon resources data processor 902 (as used the disclosure, the term "processor" encompasses microprocessors) may include one or more processors having the capability to receive and process hydrocarbon resources data, such as the data described in the disclosure. In some embodiments, the hydrocarbon resources data processor 902 may include an application-specific integrated circuit (ASIC). In some embodiments, the hydrocarbon resources data processor 902 may include a reduced instruction set (RISC) processor. Additionally, the hydrocarbon resources data processor 902 may include a single-core processors and multicore processors and may include graphics processors. Multiple processors may be employed to provide for parallel or sequential execution of one or more of the techniques described in the disclosure. The hydrocarbon resources data processor 902 may receive instructions and data from a memory (for example, memory 904).

The memory 904 (which may include one or more tangible non-transitory computer readable storage mediums) may include volatile memory, such as random access memory (RAM), and non-volatile memory, such as ROM, flash memory, a hard drive, any other suitable optical, magnetic, or solid-state storage medium, or a combination thereof. The memory 904 may be accessible by the hydrocarbon resources data processor 902. The memory 904 may store executable computer code. The executable computer code may include computer program instructions for implementing one or more techniques described in the disclosure. For example, the executable computer code may include hydrocarbon resources exploration assessment instructions 912 to implement embodiments of the present disclosure. In some embodiments, the hydrocarbon resources exploration assessment instructions 912 may implement one or more elements of process 100 described above and illustrated in FIGS. 1 and 2.

In some embodiments, the hydrocarbon resources exploration assessment instructions 912 may receive, as input, geospatial maps having hydrocarbon resources data from various databases. Such databases may include, for example, a composite common risk segment (CCRS) geospatial maps database 914, a reservoir and fluid properties geospatial maps database 916, an economics and costing geospatial maps database 918, and a prospect and leads geospatial maps database 920. The databases may each or collectively be located on or be a part of a computer cluster, cloud-computing system, a data center, a server, a virtual server, a desktop computer, or other computing system. In such embodiments, hydrocarbon resources exploration assessment computer 900 may access the databases via the network 910.

As described herein, the hydrocarbon resources exploration assessment instructions 912 may produce, as output an integrated map 922. The integrated map 922 may be stored in the memory 904 and, as shown in FIG. 9, may be displayed on the display 906, such as in a graphical user interface. In some embodiments, the graphical user interface may enable a user to define an area of interest (AOI) on the integrated map 922. In other embodiments, the area of interest (AOI) may be defined via coordinates or by other parameters.

The display 906 may include a cathode ray tube (CRT) display, liquid crystal display (LCD), an organic light emitting diode (OLED) display, or other suitable display. The display 906 may display a user interface (for example, a graphical user interface) that may display information received from the hydrocarbon resources exploration assessment computer 900. In accordance with some embodiments, the display 906 may be a touch screen and may include or be provided with touch sensitive elements through which a user may interact with the user interface. In some embodiments, the display 906 may display the integrated map 922 in accordance with the techniques described herein. For example, an exploration engineer may view the integrated map 922 on the display 906.

The network interface 908 may provide for communication between the hydrocarbon resources exploration assessment computer 900 and other devices and systems via the network 910. The network interface 908 may include a wired network interface card (NIC), a wireless (e.g., radio frequency) network interface card, or combination thereof. The network interface 908 may include circuitry for receiving and sending signals to and from communications networks, such as an antenna system, an RF transceiver, an amplifier, a tuner, an oscillator, a digital signal processor, and so forth. The network interface 908 may communicate with networks, such as the Internet, an intranet, a wide area network (WAN), a local area network (LAN), a metropolitan area network (MAN) or other networks. Communication over networks may use suitable standards, protocols, and technologies, such as Ethernet Bluetooth, Wireless Fidelity (Wi-Fi) (e.g., IEEE 802.11 standards), and other standards, protocols, and technologies. In some embodiments, for example, geospatial maps may be received over the network 910 via the network interface 908. In some embodiments, for example, the integrated map 922 may be provided to other devices over the network 910 via the network interface 908.

In some embodiments, hydrocarbon resources exploration assessment instructions 912 may be coupled to an input device 924 (for example, one or more input devices). The input devices 924 may include, for example, a keyboard, a mouse, a microphone, or other input devices. In some embodiments, the input device 924 may enable interaction with a user interface (for example, a graphical user interface) displayed on the display 906. For example, in some embodiments, the input devices 924 may enable the definition of an area of interest (AOI) on the integrated map 922.

Further modifications and alternative embodiments of various aspects of the disclosure will be apparent to those skilled in the art in view of this description. Accordingly, this description is to be construed as illustrative only and is for the purpose of teaching those skilled in the art the general manner of carrying out the embodiments described in the disclosure. It is to be understood that the forms shown and described in the disclosure are to be taken as examples of embodiments. Elements and materials may be substituted for those illustrated and described in the disclosure, parts and processes may be reversed or omitted, and certain features may be utilized independently, all as would be apparent to one skilled in the art after having the benefit of this description. Changes may be made in the elements described in the disclosure without departing from the spirit and scope of the disclosure as described in the following claims. Headings used in the disclosure are for organizational purposes only and are not meant to be used to limit the scope of the description.

What is claimed is:

1. A computer-implemented method for hydrocarbon exploration assessment, comprising:
obtaining a first geospatial map, the first geospatial map comprising geospatial data associated with composite common risk segments;
obtaining a second geospatial map, the second geospatial map comprising geospatial data associated with reservoir properties and fluid properties;
obtaining a third geospatial map, the third geospatial map comprising geospatial data associated with averaging finding costs and cost per barrel of hydrocarbon;
obtaining a fourth geospatial map, the fourth geospatial map comprising geospatial data associated expected volumes and petroleum risking details;
generating an integrated map corresponding to a geographic region and having a plurality of geospatial layers, the geographic region comprising a plurality of reservoirs, wherein the plurality of geospatial layers comprise a first geospatial layer corresponding to the first geospatial map, a second geospatial layer corresponding to the second geospatial map, a third geospatial layer corresponding to the third geospatial map, and a fourth geospatial layer corresponding to the fourth geospatial map;
defining an area of interest on the integrated map, the area of interest comprising an area within the geographic region;
determining, using the plurality of geospatial layers, a plurality of hydrocarbon exploration attributes for the area of interest, the determining comprising at least one of:
determining a yet-to-find value for the area of interest;
determining a reserve volume or a pore volume for the area of interest;
determining an average finding cost or an average well cost for the area of interest; and
determining a play chance or an estimated prospect volume for the area of interest; and
generating a visualization of a comparison of a first one of the plurality of reservoirs to a second one of the plurality of reservoirs based on at least one of the plurality of attributes, wherein the visualization comprises a quadrant plot of a first one of the plurality of attributes versus a second one of the plurality of attributes, the quadrant plot comprising a point for each of the plurality of reservoirs.

2. The method of claim 1, comprising comparing a first one of the plurality of reservoirs to a second one of the plurality of reservoirs based on at least one of the plurality of attributes.

3. The method of claim 2, comprising selecting the first one of the plurality of reservoirs for drilling based on the comparison.

4. The method of claim 3, comprising drilling a well in the first one of the plurality of reservoirs.

5. The method of claim 1, wherein determining a plurality of hydrocarbon resource attributes for the area of interest comprises performing, for each of the plurality of attributes:
determining a plurality of fractions of the defined area of interest within a respective plurality of sections of a geospatial layer of the integrated map;
determining a value of an attribute in each of the plurality of sections;
determining a plurality of fractional attributes by multiplying the attribute value for each of the plurality of sections by the respective fraction of the plurality of fractions; and
determining a value for the attribute for the defined area of interest by summing the plurality of fractional attribute values.

6. A system for hydrocarbon resource exploration assessment, comprising:

a processor;
a non-transitory computer-readable storage memory accessible by the processor and having executable code stored thereon, the executable code comprising a set of instructions that causes the processor to perform operations comprising:
obtaining a first geospatial map, the first geospatial map comprising geospatial data associated with composite common risk segments;
obtaining a second geospatial map, the second geospatial map comprising geospatial data associated with reservoir properties and fluid properties;
obtaining a third geospatial map, the third geospatial map comprising geospatial data associated with averaging finding costs and cost per barrel of hydrocarbon;
obtaining a fourth geospatial map, the fourth geospatial map comprising geospatial data associated expected volumes and petroleum risking details;
generating an integrated map corresponding to a geographic region and having a plurality of geospatial layers, the geographic region comprising a plurality of reservoirs, wherein the plurality of geospatial layers comprise a first geospatial layer corresponding to the first geospatial map, a second geospatial layer corresponding to the second geospatial map, a third geospatial layer corresponding to the third geospatial map, and a fourth geospatial layer corresponding to the fourth geospatial map;
defining an area of interest on the integrated map, the area of interest comprising an area within the geographic region;
determining, using the plurality of geospatial layers, a plurality of hydrocarbon exploration attributes for the area of interest, the determining comprising at least one of:
determining a yet-to-find value for the area of interest;
determining a reserve volume or a pore volume for the area of interest;
determining an average finding cost or an average well cost for the area of interest; and
determining a play chance or an estimated prospect volume for the area of interest; and
generating a visualization of a comparison of a first one of the plurality of reservoirs to a second one of the plurality of reservoirs based on at least one of the plurality of attributes, wherein the visualization comprises a quadrant plot of a first one of the plurality of attributes versus a second one of the plurality of attributes, the quadrant plot comprising a point for each of the plurality of reservoirs.

7. The system of claim 6, the operations comprising comparing a first one of the plurality of reservoirs to a second one of the plurality of reservoirs based on at least one of the plurality of attributes.

8. The system of claim 6, the operations comprising selecting the first one of the plurality of reservoirs for drilling based on the comparison.

9. The system of claim 6, comprising a display, wherein the operations comprise providing the visualization on the display.

10. The system of claim 6, wherein determining a plurality of hydrocarbon resource attributes for the area of interest comprises performing, for each of the plurality of attributes:
determining a plurality of fractions of the defined area of interest within a respective plurality of sections of a geospatial layer of the integrated map;
determining a value of an attribute in each of the plurality of sections;
determining a plurality of fractional attributes by multiplying the attribute value for each of the plurality of sections by the respective fraction of the plurality of fractions; and
determining a value for the attribute for the defined area of interest by summing the plurality of fractional attribute values.

11. A non-transitory computer-readable storage medium having executable code stored thereon for hydrocarbon resource exploration assessment, the executable code comprising a set of instructions that causes a processor to perform operations comprising:
obtaining a first geospatial map, the first geospatial map comprising geospatial data associated with composite common risk segments;
obtaining a second geospatial map, the second geospatial map comprising geospatial data associated with reservoir properties and fluid properties;
obtaining a third geospatial map, the third geospatial map comprising geospatial data associated with averaging finding costs and cost per barrel of hydrocarbon;
obtaining a fourth geospatial map, the fourth geospatial map comprising geospatial data associated expected volumes and petroleum risking details;
generating an integrated map corresponding to a geographic region and having a plurality of geospatial layers, the geographic region comprising a plurality of reservoirs, wherein the plurality of geospatial layers comprise a first geospatial layer corresponding to the first geospatial map, a second geospatial layer corresponding to the second geospatial map, a third geospatial layer corresponding to the third geospatial map, and a fourth geospatial layer corresponding to the fourth geospatial map;
defining an area of interest on the integrated map, the area of interest comprising an area within the geographic region;
determining, using the plurality of geospatial layers, a plurality of hydrocarbon exploration attributes for the area of interest, the determining comprising at least one of:
determining a yet-to-find value for the area of interest;
determining a reserve volume or a pore volume for the area of interest;
determining an average finding cost or an average well cost for the area of interest; and
determining a play chance or an estimated prospect volume for the area of interest; and
generating a visualization of a comparison of a first one of the plurality of reservoirs to a second one of the plurality of reservoirs based on at least one of the plurality of attributes, wherein the visualization comprises a quadrant plot of a first one of the plurality of attributes versus a second one of the plurality of attributes, the quadrant plot comprising a point for each of the plurality of reservoirs.

12. The non-transitory computer-readable storage medium of claim 11, the operations comprising comparing a first one of the plurality of reservoirs to a second one of the plurality of reservoirs based on at least one of the plurality of attributes.

13. The non-transitory computer-readable storage medium of claim 11, the operations comprising selecting the first one of the plurality of reservoirs for drilling based on the comparison.

14. The non-transitory computer-readable storage medium of claim 11, wherein determining a plurality of hydrocarbon resource attributes for the area of interest comprises performing, for each of the plurality of attributes:
- determining a plurality of fractions of the defined area of interest within a respective plurality of sections of a geospatial layer of the integrated map;
- determining a value of an attribute in each of the plurality of sections;
- determining a plurality of fractional attributes by multiplying the attribute value for each of the plurality of sections by the respective fraction of the plurality of fractions; and
- determining a value for the attribute for the defined area of interest by summing the plurality of fractional attribute values.

15. A computer-implemented method for hydrocarbon exploration assessment, comprising:
- obtaining a first geospatial map, the first geospatial map comprising geospatial data associated with composite common risk segments;
- obtaining a second geospatial map, the second geospatial map comprising geospatial data associated with reservoir properties and fluid properties;
- obtaining a third geospatial map, the third geospatial map comprising geospatial data associated with averaging finding costs and cost per barrel of hydrocarbon;
- obtaining a fourth geospatial map, the fourth geospatial map comprising geospatial data associated expected volumes and petroleum risking details;
- generating an integrated map corresponding to a geographic region and having a plurality of geospatial layers, the geographic region comprising a plurality of reservoirs, wherein the plurality of geospatial layers comprise a first geospatial layer corresponding to the first geospatial map, a second geospatial layer corresponding to the second geospatial map, a third geospatial layer corresponding to the third geospatial map, and a fourth geospatial layer corresponding to the fourth geospatial map;
- defining an area of interest on the integrated map, the area of interest comprising an area within the geographic region;
- determining, using the plurality of geospatial layers, a plurality of hydrocarbon exploration attributes for the area of interest, the determining comprising at least one of:
  - determining a yet-to-find value for the area of interest;
  - determining a reserve volume or a pore volume for the area of interest;
  - determining an average finding cost or an average well cost for the area of interest; and
  - determining a play chance or an estimated prospect volume for the area of interest;
- comparing a first one of the plurality of reservoirs to a second one of the plurality of reservoirs based on at least one of the plurality of attributes;
- selecting the first one of the plurality of reservoirs for drilling based on the comparison; and
- drilling a well in the first one of the plurality of reservoirs.

* * * * *